United States Patent
Schenk et al.

(10) Patent No.: US 11,322,918 B2
(45) Date of Patent: May 3, 2022

(54) INSTALLATION TOOL FOR HIGH VOLTAGE POWER LINE INSULATORS

(71) Applicants: Spencer James Schenk, Ainsworth, NE (US); Hadan Sybrant, Bassett, NE (US)

(72) Inventors: Spencer James Schenk, Ainsworth, NE (US); Hadan Sybrant, Bassett, NE (US)

(73) Assignee: Spencer James Schenk, Ainsworth, NE (US)

( * ) Notice: Subject to any disclaimer, the term of this patent is extended or adjusted under 35 U.S.C. 154(b) by 466 days.

(21) Appl. No.: 15/797,256

(22) Filed: Oct. 30, 2017

(65) Prior Publication Data

US 2019/0131777 A1 May 2, 2019

(51) Int. Cl.
*H02G 1/02* (2006.01)
*B25B 13/06* (2006.01)

(52) U.S. Cl.
CPC .............. *H02G 1/02* (2013.01); *B25B 13/065* (2013.01)

(58) Field of Classification Search
CPC ...... H02G 1/1212; H02G 1/1256; H02G 7/00; H02G 1/02; B23G 1/261–268; B25B 13/06; B25B 13/065; B25B 13/04; B25B 13/48; B25B 23/0071; B25B 23/16; B25B 13/50; B25B 13/02; B25B 33/00
USPC ...................................................... D8/29, 21
See application file for complete search history.

(56) References Cited

U.S. PATENT DOCUMENTS

| 37,865 | A | * | 3/1863 | Griswold | ................ B25B 13/08 81/125.1 |
| 1,512,183 | A | * | 10/1924 | Miller | ..................... B23G 1/262 408/240 |
| 2,291,593 | A | | 7/1942 | Hubbard | |
| 2,293,866 | A | * | 8/1942 | Talch | ...................... B22D 19/06 76/114 |
| 2,316,243 | A | | 4/1943 | Hubbard | |
| 2,486,022 | A | * | 10/1949 | Haist | ....................... B25B 13/06 7/166 |
| 2,505,186 | A | | 4/1950 | Hubbard | |
| 2,879,963 | A | | 3/1959 | Burgess et al. | |
| 3,121,356 | A | * | 2/1964 | Davis | ...................... B25B 13/08 81/125.1 |
| D344,437 | S | * | 2/1994 | Cleland | ........................... D8/21 |

(Continued)

FOREIGN PATENT DOCUMENTS

CH 165567 A * 11/1933 ............. B25B 13/06

*Primary Examiner* — Livius R. Cazan
(74) *Attorney, Agent, or Firm* — Luke C. Holst; McGrath North Mullin & Kratz, PC LLO

(57) ABSTRACT

The present invention relates in general to the field of high voltage power line insulators, and more specifically, to a tool for installing high voltage power line insulators and a method of use. The installation tool includes a feature that allows a lineworker to safely install high voltage power line insulators of different shapes and sizes using the same installation tool. In particular, the installation tool comprises differently sized sockets that correspond to the distinct head size dimensions of different types of high voltage power line insulators. A purpose of the invention is to provide a tool for installing high voltage power line insulators and a method of use that minimizes risk of injury to the lineworker during installation, is easy to use, and cost-effective to manufacture.

20 Claims, 4 Drawing Sheets

(56) References Cited

U.S. PATENT DOCUMENTS

| | | | |
|---|---|---|---|
| 5,440,956 A * | 8/1995 | Johnstun | B25B 13/48 |
| | | | 81/119 |
| 6,112,625 A * | 9/2000 | Turtle | B25B 23/0021 |
| | | | 81/177.1 |
| 6,367,357 B1 | 4/2002 | Thomas | |
| 7,556,540 B2 | 7/2009 | Siebens et al. | |
| 8,539,864 B1 * | 9/2013 | Kennedy | B25B 13/461 |
| | | | 81/177.8 |
| 8,759,684 B2 | 6/2014 | Seifert | |
| 9,498,878 B2 | 11/2016 | Baker | |
| 2009/0017667 A1 | 1/2009 | Siebens et al. | |
| 2011/0277598 A1 * | 11/2011 | Kim | B25B 13/16 |
| | | | 81/175 |
| 2012/0168224 A1 | 7/2012 | Seifert | |
| 2016/0082582 A1 | 3/2016 | Barker | |

* cited by examiner

INSTALLATION TOOL FOR HIGH VOLTAGE POWER LINE INSULATORS

FIELD OF THE INVENTION

The present invention relates in general to the field of high voltage power line insulators, and more specifically, to a tool for installing high voltage power line insulators and a method of use. A purpose of the invention is to provide a tool that allows a lineworker to safely and conveniently install and remove high voltage power line insulators from the cross-arms of utility poles. An additional purpose of invention is to provide a tool for installing high voltage power line insulators and a method of use that is easy to operate, cost-effective to manufacture and convenient to store.

BACKGROUND OF THE INVENTION

High voltage power line insulators, also referred to as transmission or distribution insulators, are used in the electric utility industry to secure high voltage power lines onto cross-arms of utility poles. The primary function of an insulator is to provide support for the high voltage power line mechanically, wherein the secondary function is to provide insulation for the electrical current traversing through the high voltage power line. Insulators today are comprised of porcelain, ceramics, glass, fiberglass, polymers, metals, plastics and combinations thereof. The installation of an insulator onto the cross-arm of a utility pole requires a high level of care for the lineworker because of safety risks, such as falling from great heights while working atop utility poles or electrocution from the high voltage that runs through the power lines. Problems further abound as a direct result of the delicate composition of the insulators, which are easily damaged, chipped or fractured during installation using traditional wrenches, pliers and tools. Thus, the dangerous conductive nature of traditional tools and the ability to easily damage an insulator creates an undesirable and unsatisfactory outcome. For these reasons lineworkers often resort to utilizing a short rope as an installation tool, wherein the rope is twisted around the insulator and used to turn the insulator during installation or removal from the cross-arm of a utility pole. This awkward process requires two hands and becomes exhausting for the lineworker overtime as multiple insulators are installed. Moreover, safety becomes an issue as the insulator may be accidentally dropped—at great heights—while installing the insulator atop a utility pole. Thus, a desire remains to provide a tool for installing high voltage power line insulators and a method of use that mitigates exhaustion and risk of injury for a lineworker associated with traditional installation tools. A desire also remains to provide a tool for installing high voltage power line insulators and a method of use that may be easily operated by a lineworker and conveniently stored in a tool kit after use.

BRIEF SUMMARY OF THE INVENTION

Therefore, it is a principal object, feature, and/or advantage of the present invention to overcome the aforementioned deficiencies in the art and provide a tool for installing high voltage power line insulators and a method of use that minimizes safety concerns and risk of injury for a lineworker.

Another object, feature, and/or advantage of the present invention is to provide a tool for installing high voltage power line insulators and a method of use that is sturdy and allows a lineworker to apply significant force when installing an insulator onto a cross-arm of a utility pole without damaging the insulator.

Yet another object, feature, and/or advantage of the present invention is to provide a tool for installing high voltage power line insulators and a method of use that maximizes efficiency, is easy to operate and convenient to use.

A further object, feature, and/or advantage of the present invention is to provide a tool for installing high voltage power line insulators and a method of use that is nonconductive to reduce risk of electrocution to a lineworker.

A still further object, feature, and/or advantage of the present invention is to provide a tool for installing high voltage power line insulators and a method of use that may be utilized for insulators of different shapes and sizes.

Another object, feature, and/or advantage of the present invention is to provide a tool for installing high voltage power line insulators and a method of use that is convenient to clean and maintain.

Yet another object, feature, and/or advantage of the present invention is to provide a tool for installing high voltage power line insulators and a method of use that may be conveniently stored (e.g., in a toolkit, pouch, tool belt, etc.) by a lineworker when not in use.

A further object, feature, and/or advantage of the present invention is to provide a tool for installing high voltage power line insulators and a method of use that is simple and cheap to manufacture.

A still further object, feature, and/or advantage of the present invention is to provide a tool for installing high voltage power line insulators and a method of use that is inexpensive, value-priced and thus affordable for the everyday consumer.

Another object, feature, and/or advantage of the present invention is to provide a tool for installing high voltage power line insulators and a method of use that may be used commercially in the electric utility industry.

These and/or other objects, features, and/or advantages of the present invention will be apparent to those skilled in the art. The present invention is not to be limited to or by these objects, features, and advantages. No single aspect need provide each and every object, feature, or advantage.

According to one aspect of the present invention, an installation tool is provided for installing a high voltage power line insulator to a cross-arm of a utility pole. The installation tool comprises a central socket portion having a first socket and a second socket. The first socket and second socket comprise sizes configured to fit the head size dimensions (e.g., length×width) of a C-Neck, F-Neck, N-Neck, J-Neck, K-Neck, 34.5 kV or any other type of high voltage power line insulator commonly used in the electric utility industry. The size of the first socket is different than the size of the second socket to enable the installation tool to be utilized for different types of high voltage power line insulators. The installation tool further comprises at least one handle attached to the central socket portion to enable a lineworker to easily grip and rotate the installation tool when using the installation tool to install high voltage power line insulators to cross-arms of utility poles.

According to another aspect of the present invention a method of installing a high voltage power line insulator onto a cross-arm of a utility pole is provided. The method includes providing a high voltage power line insulator, cross-arm of a utility pole and an installation tool of the present invention. The method next comprises identifying the particular type of high voltage power line insulator provided, for example, whether the high voltage power line insulator is a C-Neck, F-Neck, N-Neck, J-Neck, K-Neck, 34.5 kV or other type of high voltage power line insulator commonly used in the electric utility industry. The method also comprises selecting a correspondingly-sized socket of the installation tool, wherein the socket is configured to fit the distinct head size dimension of the high voltage power line insulator. The mounting pin of the high voltage power line insulator is inserted into a pre-drilled hole traversing through the cross-arm of the utility pole. Furthermore, the selected socket of the installation tool may be securely fitted over the head of the high voltage power line insulator. Using the handles, the installation tool may then be rotated to install the high voltage power line insulator to the cross-arm of the utility pole. After use, the installation tool (24) may be conveniently stored in a toolkit, pouch, tool belt, etc. of the lineworker.

Different aspects may meet different objects of the invention. Other objectives and advantages of this invention will be more apparent in the following detailed description taken in conjunction with the figures. The present invention is not to be limited by or to these objects or aspects.

DESCRIPTION OF FIGURES

FIG. 1 is an isometric, side view of a high voltage power line insulator affixed to a cross-arm of a utility pole.

FIG. 2 is an isometric, cross-sectional side view of an installation tool of the present invention for installing the high voltage power line insulator of FIG. 1.

FIG. 3 is an isometric top view of the installation tool of the present invention for installing the high voltage power line insulator of FIG. 1.

FIG. 4 is an isometric, cross-sectional end view of the installation tool of the present invention for installing the high voltage power line insulator of FIG. 1.

FIG. 5 is an isometric top view of the installation tool of the present invention comprising a size-adjustable socket for installing the high voltage power line insulator of FIG. 1.

FIG. 6 is an isometric, side view of the installation tool and method of the present invention for installing the high voltage power line insulator to a cross-arm of a utility pole of FIG. 1.

DETAILED DESCRIPTION OF THE INVENTION

Figure 1:
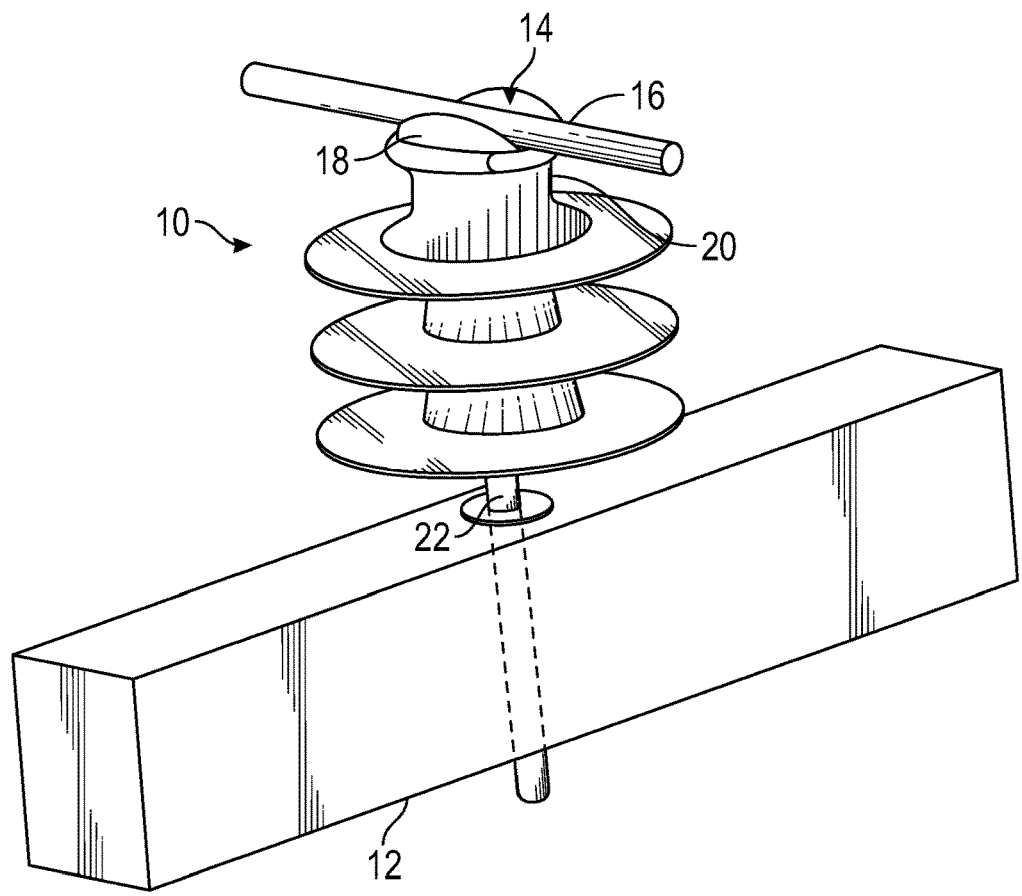
FIGS. 1-6 represent examples of installation tools of the present invention for installing high voltage power line insulators, including a method of installing a high voltage power line insulator to a cross-arm of a utility pole using the installation tool of the present invention.

FIG. 1 illustrates an isometric, side view of an exemplary high voltage power line insulator (10) affixed to a cross-arm (12) of a utility pole (not shown), as used currently in the electric utility industry. High voltage power line insulators (10) are also commonly referred to as transmission or distribution insulators. Components of the high voltage power line insulator (10) include a saddle (14) for supporting a high voltage power line (16), also known as a transmission or distribution line. Additional components of the high voltage power line insulator (10) include a head (18), neck (20) and mounting pin (22). The high voltage power line insulator (10) may comprise a C-Neck, F-Neck, N-Neck, J-Neck, K-Neck, 34.5 kV or any other type of high voltage power line insulator (10) commonly used in the electric utility industry. In particular, the head (18) may comprise a distinct size dimension (e.g., length×width) depending on whether it is a C-Neck, F-Neck, N-Neck, J-Neck, K-Neck, 34.5 kV or another type of high voltage power line insulator (10). The mounting pin (22) is configured to be inserted into a pre-drilled hole traversing through the cross-arm (12) of the utility pole. The mounting pin (22) is tightly screwed through the pre-drilled hole to affix the high voltage power line insulator (10) to the cross-arm (12) of the utility pole. High voltage power line insulators (10) may be comprised of porcelain, ceramics, glass, fiberglass, polymers, metals, plastics and/or combinations thereof.

Figure 2:
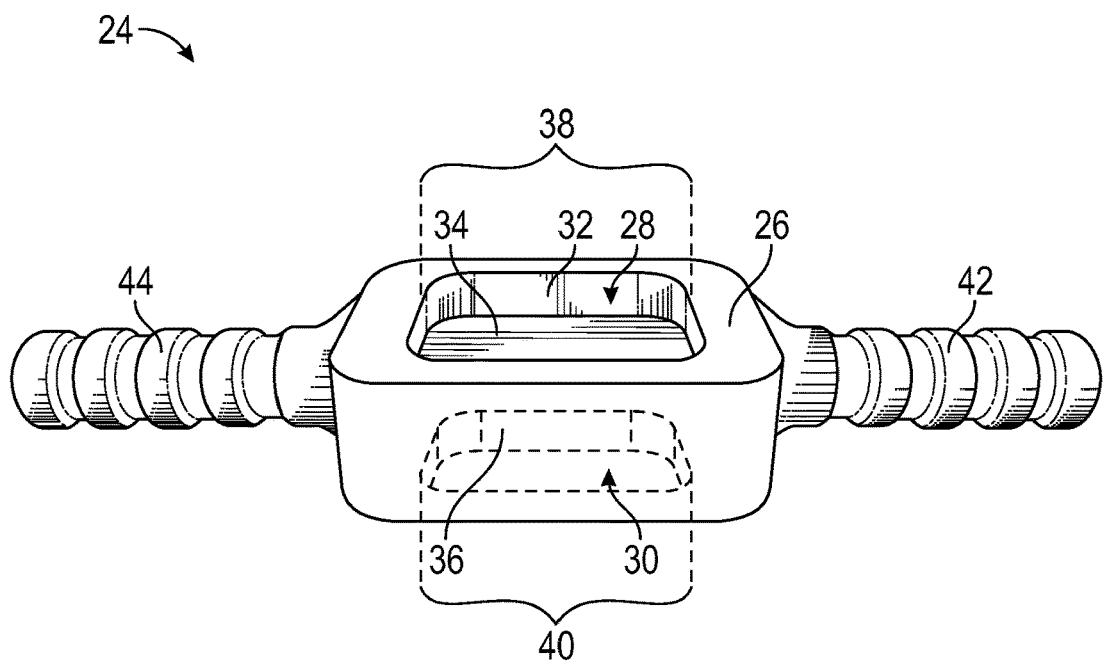

FIG. 2 illustrates an isometric, cross-sectional side view of one aspect of the present invention, an installation tool (24) for installing the high voltage power line insulator (10) to the cross-arm (12) of a utility pole. The installation tool (24) of the present invention may be configured to install high voltage power line insulators (10) of all shapes and sizes, including, as a non-limiting example, a C-Neck, F-Neck, N-Neck, J-Neck, K-Neck, 34.5 kV or any other type of high voltage power line insulator (10) commonly used in the electric utility industry. Overall lengths of the installation tool (24) of the present invention may range between 1-6 feet. Overall widths of the installation tool (24) of the present invention may range between 3-8 inches. Overall heights of the installation tool (24) of the present invention may range between 1-3 inches. The installation tool (24) of the present invention may be comprised of wood, plastics, fiberglass, polymers, metals, combinations thereof and/or other nonconductive materials standardly used in the electric utility industry to reduce the risk of electrocution to the lineworker during installation of the high voltage power line insulator (10).

Figure 3:
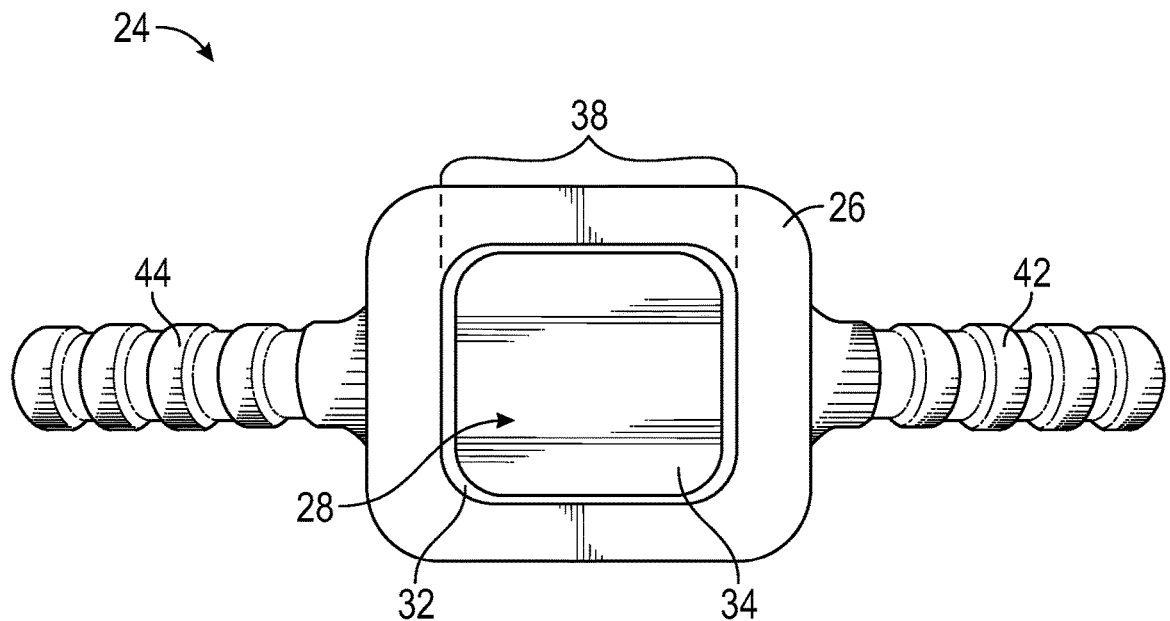
Figure 4:
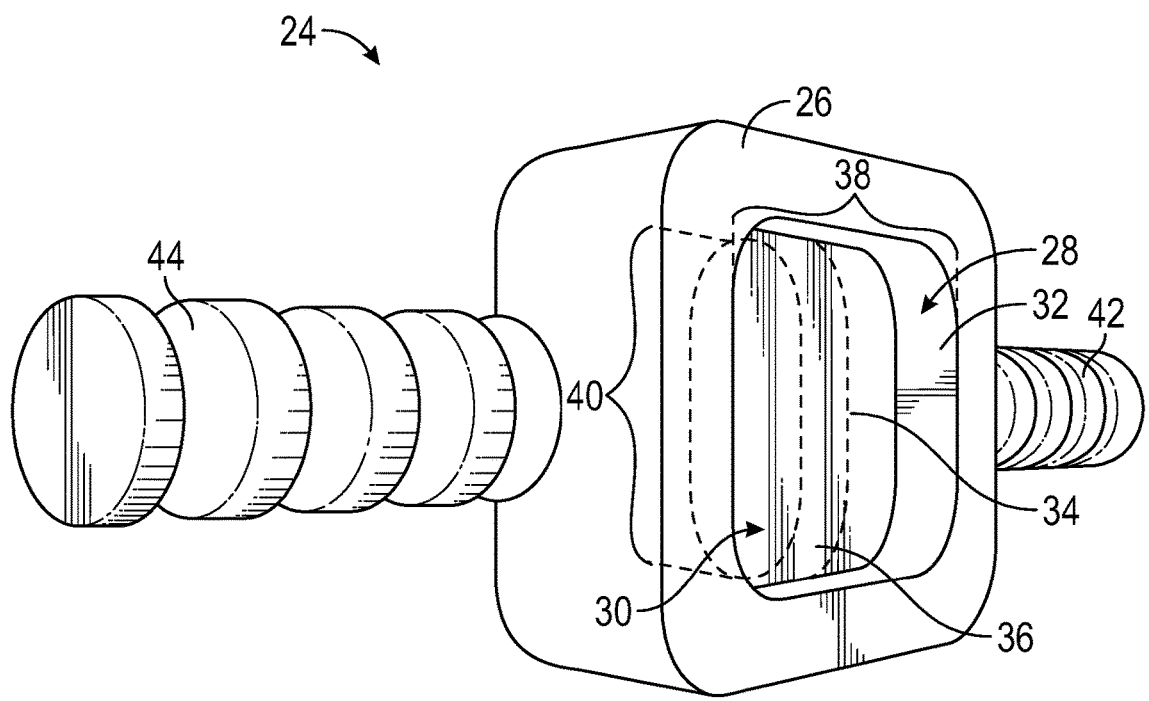

Illustrated in FIGS. 2-4, the installation tool (24) may comprise a central socket portion (26) with at least one socket. In particular, the central socket portion (26) may comprise a first socket (28) and a second socket (30). The first and second sockets (28, 30) may be located on opposite sides of the central socket portion (26). While the central socket portion (26) depicted in FIGS. 2-4 is shown as having a first and second socket (28, 30), it is contemplated by the present invention that additional sockets may also be incorporated. The first socket (28) may comprise a four-sided socket wall (32) and a partition (34). The second socket (30) may comprise a four-sided socket wall (36) and the partition (34), wherein the partition (34) separates the first socket (28) from the second socket (30). The first socket (28) and the second socket (30) may each comprise a depth of approximately ½-1 inch. The first socket (28) further comprises a first size (36) configured to fit the head (18) size dimensions (e.g., length×width) of a C-Neck, F-Neck, N-Neck, J-Neck, K-Neck, 34.5 kV or any other type of high voltage power line insulator (10) commonly used in the electric utility industry. The second socket (30) comprises a second size (38) configured to fit the head (18) size dimensions (e.g., length×width) of a C-Neck, F-Neck, N-Neck, J-Neck, K-Neck, 34.5 kV or any other type of high voltage power line insulator (10) commonly used in the electric utility industry. The first size (36) of the first socket (28) is different than the second size (38) of the second socket (30), wherein the first socket (28) is configured to be utilized for the distinct head (18) size dimension of a different type of high voltage power line insulator (10) than the second socket (30).

Further illustrated in FIGS. 2-4, the installation tool (10) comprises at least one handle. In particular, the installation tool (10) comprises a first handle (42) attached to a first end of the central socket portion (26) and a second handle (44) attached to an opposite second end of the central socket portion (26). The first and second handles (42, 44) and the adjacent central socket portion (26) may be formed integrally together or formed separately and permanently affixed together thereafter. Alternatively, the first and second handles (42, 44) may be configured to be removably attached to the central socket portion (26) via screws, threaded bolts, clips, locks, clamps, snaps, tabs, or other means of attachment commonly used in the electric utility industry. The first and second handles (42, 44) may also be attached to the central socket portion (26) via hinges, wherein the first and second handles (42, 44) may be folded in opposite directions and against the central socket portion (26) to reduce the overall length of the installation tool (24) and provide convenient storage capabilities. The first and second handles (42, 44) may comprise a tubular shape configured to allow a lineworker to easily grip and rotate the installation tool (24). While the first and second handles (42, 44) are depicted in FIGS. 2-4 as having a circular tubular shape, however, it is contemplated that other tubular shapes may also be utilized by the present invention (e.g., hexagonal, pentagonal, square, oval, rectangular, triangular, etc.). It is further contemplated by the present invention that a gripping portion may also be incorporated into the first and second handles (42, 44) to further assist a lineworker in easily gripping and rotating the installation tool (24) when in use, such as incorporating soft rubbers, foams and fingerholds.

Figure 5:
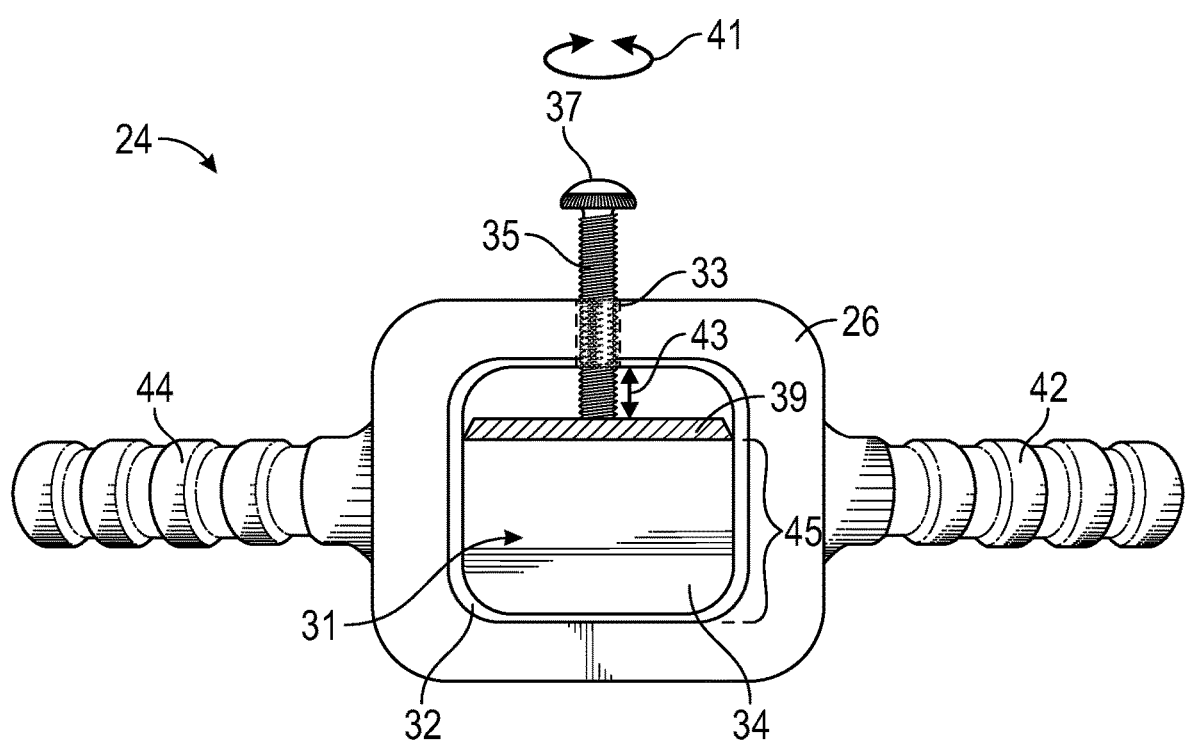

FIG. 5 illustrates another aspect of the present invention, wherein the central socket portion (26) of the installation tool (24) of FIGS. 2-4 may comprise a size-adjustable socket (31). The size-adjustable socket (31) may comprise the four-sided socket wall (32) and the partition (34). The size-adjustable socket (31) may comprise a depth of approximately ½-1 inch. The size-adjustable socket (31) may further comprise a threaded hole (33) traversing through a socket wall (32) and a threaded bolt (35). The threaded bolt (35) is configured to be screwed into and through the threaded hole (33) via matching threads on the bolt (35) and hole (33), as commonly used in the industry. The threaded bolt (35) comprises a first end and an opposite second end, wherein a tightening knob (37) is affixed to the first end and a movable clamp (39) is affixed to the opposite second end of the threaded bolt (35). The size-adjustable socket (31) is configured to allow a lineworker to grip and turn (41) the tightening knob (37) to correspondingly move (43) the movable clamp (39) inside the size-adjustable socket (31). Moving (43) the movable clamp (39) changes a socket size (45) of the size-adjustable socket (31). In particular, turning (41) the tightening knob (37) clockwise decreases the size (45) of the size-adjustable socket (31) to fit the head (18) size dimensions of smaller high voltage power line insulators (10). Conversely, turning (41) the tightening knob (37) counter-clockwise increases the size (45) of the size-adjustable socket (31) to fit the head (18) size dimensions of larger high voltage power line insulators (10). The size-adjustable socket (31) may replace the first and second sockets (28, 30) of the central socket portion (26) of FIGS. 2-4. Alternatively, the threaded hole (33), threaded bolt (35), tightening knob (37) and movable clamp (39) may be incorporated into an existing first or second socket (28, 30) of the central socket portion (26) of FIGS. 2-4, to modify the existing first or second socket (28, 30) into a size-adjustable socket (31). Thus, the present invention comprising the size-adjustable socket (31) may accommodate the head (18) size dimensions (e.g., length×width) of a C-Neck, F-Neck, N-Neck, J-Neck, K-Neck, 34.5 kV or any other type of high voltage power line insulator (10) commonly used in the electric utility industry.

Figure 6:
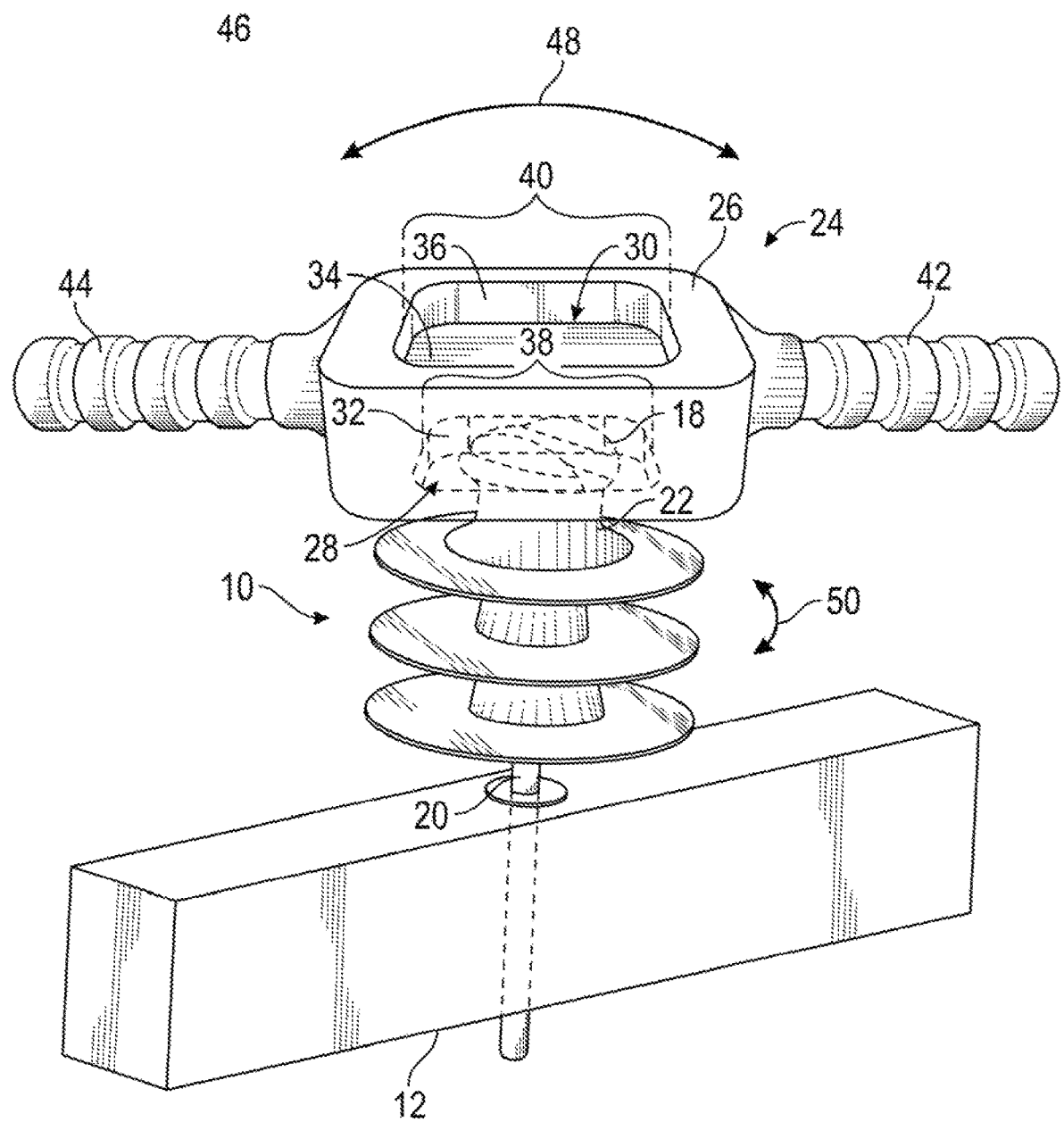

FIG. 6 illustrates yet another aspect of the present invention, a method (46) of installing a high voltage power line insulator (10) onto a cross-arm (12) of a utility pole (not shown). The method (46) comprises providing the high voltage power line insulator (10), cross-arm (12) of the utility pole and installation tool (24) as illustrated in FIGS. 1-5 and detailed above. The method (46) further comprises identifying the particular type of high voltage power line insulator (10) provided, for example, whether the high voltage power line insulator (10) is a C-Neck, F-Neck, N-Neck, J-Neck, K-Neck, 34.5 kV or other type of high voltage power line insulator (10) commonly used in the electric utility industry. Once the particular type of high voltage power line insulator (10) is identified, the method (46) of the present invention further comprises selecting a correspondingly-sized first or second socket (26, 28) of the installation tool (10), wherein the first or second socket (26, 28) is configured to fit the distinct head (18) size dimensions of the high voltage power line insulator (10). For example, if the high voltage power line insulator (10) is a C-Neck insulator, the correspondingly-sized first or second socket (26, 28) of the installation tool (10) selected is configured to fit the distinct head (18) size dimensions of the C-Neck high voltage power line insulator (10) (e.g., 3¼ inches in length× 2¼ inches in width). The aforementioned example is to be non-limiting, as it is contemplated that other socket sizes and types of high voltage power line insulators may also be utilized by the method (46) of the present invention.

As shown in FIG. 6, the method (46) of the present invention further comprises inserting the mounting pin (22) of the high voltage power line insulator (10) into the pre-drilled hole traversing through the cross-arm (12) of the utility pole. The selected first or second socket (26, 28) of the installation tool (10) may be securely fitted over the correspondingly-sized head (18) of the high voltage power line insulator (10). Using the first handle (42) and/or the second handle (44), the installation tool (24) may be grasped and rotated (48) to install the high voltage power line insulator (10) to the cross-arm (12) of the utility pole. In particular, rotating (48) the installation tool (24) in turn rotates (50) the high voltage power line insulator (10) via the selected first or second socket (26, 28) securely fitted over the head (18) of the high voltage power line insulator (10). Rotating (50) the high voltage power line insulator (10) thus screws the mounting pin (22) into the pre-drilled hole and through the cross-arm (12) of the utility pole. The installation tool (24) may be rotated (48) in a clockwise fashion to install the high voltage power line insulator (10) in the cross-arm (12) of the utility pole, or alternatively, rotated (48) in a counter-clockwise fashion to remove an installed high voltage power line insulator (10) from the cross-arm (12) of the utility pole. After use, the installation tool (24) may be conveniently stored in a toolkit, pouch, tool belt, etc. of a lineworker. In this manner, the method (46) of the present invention minimizes safety concerns and risk of injury to a lineworker when installing high voltage power line insulators (10) while maximizing efficiency and ease to operate. The method (46) of the present invention also allows a lineworker to safely install high voltage power line insulators (10) of different shapes and sizes using the same installation tool (24) and lowers the risk of damage to the insulator during installation to reduce maintenance costs.

The installation tool (24) of the present invention and method (46) of installing a high voltage power line insulator

(10) onto a cross-arm (12) of a utility pole are universally applicable to high voltage power line insulators (10) of all shapes and sizes, makes, brands, models, and manufacturers. Furthermore, while intended for use with high voltage power lines (16) affixed to the cross-arms (12) of utility poles, the installation tool (24) of the present invention may be used for other electric utility industry purposes wherein high voltage power line insulators (10) are also utilized. Although the invention has been described and illustrated with respect to preferred aspects thereof, it is not to be so limited since changes and modifications may be made therein which are within the full intended scope of the invention.

EXAMPLES

In a first example of the installation tool (24) of the present invention, the first size (38) of the first socket (28) may be configured to fit the head (18) size dimensions of a C-Neck high voltage power line insulator (10) (e.g., 3¼ inches in length×2¼ inches in width) while the second size (40) of the second socket (30) may be configured to fit the head (18) size dimensions of an F-Neck high voltage power line insulator (10) (e.g., 3⅝ inches in length×3 inches in width). In a second example of the installation tool (24) of the present invention, the first size (38) of the first socket (28) may be configured to fit the head (18) size dimensions of an J-Neck high voltage power line insulator (10) (e.g., 3½ inches in length×2⅞ inches in width) while the second size (40) of the second socket (30) may be configured to fit the head (18) size dimensions of an K-Neck high voltage power line insulator (10) (e.g., 4 inches in length×4 inches in width). In a third example of the installation tool (24) of the present invention, the first size (38) of the first socket (28) may be configured to fit the head (18) size dimensions of an 34.5 kV high voltage power line insulator (10) (e.g., 4½ inches in length×3½ inches in width) while the second size (40) of the second socket (30) may be configured to fit the head (18) size dimensions of an N-Neck high voltage power line insulator (10) (e.g., 4 inches in length×3 inches in width). The aforementioned examples are to be non-limiting, as it is contemplated that various socket size combinations and/or other socket size combinations may also be utilized by the installation tool (24) of the present invention for either the first or second socket (28, 30). Thus, the same installation tool (24) of the present invention may be utilized for installing high voltage power line insulators (10) of different shapes and sizes, such as C-Neck, F-Neck, N-Neck, J-Neck, K-Neck, 34.5 kV or any other type of high voltage power line insulator (10) commonly used in the electric utility industry.

What is claimed is:

1. A tool for installing or removing high voltage power line insulators to or from cross-arms of utility poles, comprising:
   a central socket portion;
   the central socket portion comprising:
   a) a first socket located on a first side of the central socket portion;
   b) a second socket located on an opposite second side of the central socket portion;
   c) a partition fully separating the first socket from the second socket;
   d) for at least one of the first and second socket, an intersection of the socket inner surface with a plane parallel to the partition is generally rectangular of at least 3¼ inches in length by at least 2¼ inches in width;
   a first handle attached to a first end of the central socket portion;
   a second handle attached to an opposite second end of the central socket portion;
   the first socket of the central socket portion comprising a first size;
   the second socket of the central socket portion comprising a second size; and
   the first size of the first socket and the second size of the second socket being different sizes configured to fit different head size dimensions of high voltage power line insulators;
   wherein the tool is electrically non-conductive.

2. The tool of claim 1, wherein the first socket is configured to fit a head size dimension of a C-Neck high voltage power line insulator or a J-Neck high voltage power line insulator.

3. The tool of claim 2, wherein the second socket is configured to fit a head size dimension of a F-Neck high voltage power line insulator or a K-Neck high voltage power line insulator.

4. The tool of claim 1, wherein the first handle and the second handle are integral with the central socket portion.

5. The tool of claim 1, wherein the first handle and the second handle are hingedly attached to the central socket portion.

6. A tool for installing or removing high voltage power line insulators to or from cross-arms of utility poles, comprising:
   a central socket portion;
   the central socket portion comprising:
   a) a first socket;
   b) a second socket;
   c) a partition fully separating the first socket from the second socket;
   d) for at least one of the first and second socket, an intersection of the socket inner surface with a plane parallel to the partition is generally rectangular of at least 3¼ inches in length by at least 2¼ inches in width;
   the first socket and the second socket being different sizes configured to fit different head size dimensions of high voltage power line insulators; and
   at least one handle attached to the central socket portion.

7. The tool of claim 6 being electrically non-conductive.

8. The tool of claim 6, further comprising:
   a first handle attached to a first end of the central socket portion;
   a second handle attached to an opposite second end of the central socket portion; and
   the first handle and the second handle hingedly attached to the central socket portion.

9. The tool of claim 8, wherein the first handle and the second handle are configured to fold against the central socket portion; and
   the folding of the first handle and the second handle against the central socket portion decreases an overall size of the installation tool.

10. The tool of claim 6, further comprising:
    the first socket and the second socket configured to fit head size dimensions of the following:
    a) a C-Neck high voltage power line insulator;
    b) an F-Neck high voltage power line insulator;
    c) a J-Neck high voltage power line insulator;

d) a K-Neck high voltage power line insulator;
e) an N-Neck high voltage power line insulator; or
f) a 34.5 kV high voltage power line insulator.

11. The tool of claim 6, wherein the first socket or the second socket is a size-adjustable socket.

12. The tool of claim 11, wherein the size-adjustable socket comprises:
a) a threaded hole;
b) the threaded hole traversing through a wall of the size-adjustable socket;
c) a threaded bolt;
d) the threaded bolt configured to fit inside the threaded hole;
e) the threaded bolt comprising a first end and a second end;
f) a knob located on the first end of the threaded bolt; and
g) a clamp located on the second end of the threaded bolt.

13. The tool of claim 12, further comprising:
the knob configured to rotate clockwise;
wherein rotation of the knob clockwise decreases a size of the size-adjustable socket.

14. The tool of claim 13, further comprising:
the knob configured to rotate counter-clockwise;
wherein rotation of the knob counter-clockwise increases the size of the size-adjustable socket.

15. The tool of claim 6, further comprising:
a first handle attached to a first end of the central socket portion;
a second handle attached to an opposite second end of the central socket portion; and
the first handle and the second handle integral with the central socket portion.

16. A method of installing a high voltage power line insulator to a cross-arm of a utility pole, comprising:
providing a type of high voltage power line insulator;
providing a utility pole;
providing a cross-arm on the utility pole;
providing a tool for installing the high voltage power line insulator to the cross-arm of the utility pole, the tool comprising:
a) a central socket portion;
b) the central socket portion comprising:
i. a first socket;
ii. a second socket;
iii. a partition;
c) at least one handle attached to the central socket portion;
d) the first socket and the second socket configured to fit different head size dimensions of high voltage power line insulators;
identifying the particular type of high voltage power line insulator provided;
selecting the correspondingly-sized first or second socket of the tool fitting a distinct head size dimension of the high voltage power line insulator provided;
inserting a mounting pin of the high voltage power line insulator into a hole traversing through the cross-arm of the utility pole;
securely fitting the selected first or second socket of the tool over the head of the high voltage power line insulator;
rotating the tool using the at least one handle;
rotating the high voltage power line insulator via the tool; and
screwing the mounting pin into the hole and through the cross-arm of the utility pole using the tool to install the high voltage power line insulator.

17. The method of claim 16, wherein the first socket fits head size dimensions of a C-Neck high voltage power line insulator.

18. The method of claim 17, wherein the second socket fits head size dimensions of an F-Neck high voltage power line insulator.

19. The method of claim 16, wherein the first socket fits head size dimensions of a J-Neck high voltage power line insulator.

20. The method of claim 19, wherein the second socket fits head size dimensions of a K-Neck high voltage power line insulator.

\* \* \* \* \*